United States Patent [19]
Near et al.

[11] Patent Number: 5,995,091
[45] Date of Patent: *Nov. 30, 1999

[54] SYSTEM AND METHOD FOR STREAMING MULTIMEDIA DATA

[75] Inventors: Scott Near, Littleton; Safa Alai, Golden, both of Colo.

[73] Assignee: Learn2.com, Inc., White Plains, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/644,204

[22] Filed: May 10, 1996

[51] Int. Cl.$^6$ ........................................ G06T 1/00
[52] U.S. Cl. .............................................. 345/302
[58] Field of Search .................... 395/806, 807, 395/173–175, 511, 514, 526; 345/302, 326–333

[56] References Cited

U.S. PATENT DOCUMENTS 5,611,038  3/1997  Shaw et al. .............................. 395/806
5,630,067  5/1997  Kindell et al. ....................... 395/806 X

*Primary Examiner*—Almis R. Jankus
*Attorney, Agent, or Firm*—Cooper & Dunham LLP

[57] ABSTRACT

A multimedia system and method for providing consistent playback performance across a variety of playback system and network configurations. The multimedia system and method includes an authoring tool element, an interleaver element, and a playback interpreter element. The authoring tool is used by an author build a presentation script specifying images and/or sounds and times for their playback. The authoring tool determines whether the images and/or sounds can be delivered for playback at the specified times within the bandwidth specified by the author. An interleaver element is used to compress and combine images and sounds data from existing multimedia data elements into an interleaved playback data stream for delivery of a multimedia presentation within the author-specified bandwidth. The playback interpreter element is used to deinterleave, decompress and interpret the playback data stream in a timed, coordinated manner to provide consistent predictable playback performance. The playback interpreter element includes event handling software for monitoring events and initiating branching or other conditioned performances based on conditional statements extracted from the playback data stream during run-time.

12 Claims, 7 Drawing Sheets

SYSTEM AND METHOD FOR STREAMING MULTIMEDIA DATA

The present invention relates to a computer implemented images and/or sounds reproducing system, and more specifically to a computer implemented system for providing consistent, timed, coordinated playback of images and/or sounds despite differences in playback system speed or configuration.

BACKGROUND OF THE INVENTION

Existing computer implemented systems used to assemble and display image and sound presentations employ "load and play" operating principles. In such "load and play" systems, an author builds a presentation file which specifies a number of multimedia data elements, e.g. image files, video segment files, or digital audio segment files to be displayed in the presentation. At run-time, all of the multimedia data elements specified in the presentation file are loaded into the memory of a playback computer system and then played back, one after another, in the sequence specified in the presentation file.

However, load and play systems are subject to certain operational constraints which make them disadvantageous for assembling and playing back multimedia presentations. First, in load and play systems all multimedia data elements to be played back during a presentation must be loaded into the playback system's memory before playback can begin. Further, each multimedia data element must be loaded in full into active memory of the playback system before it can be played back.

These constraints have the effect of requiring all systems used for playing back the presentation to have large memory resources available, both as active memory for playing back particular multimedia data elements, and as larger, slower access, local storage media, e.g. magnetic, optical and/or magneto-optic disc or tape drives. However, since playback systems have finite active memory resources, load and play systems are subject to undesirable breaks during playback during which multimedia data elements are loaded into the playback system's active memory from the larger, slower access storage media and/or networks.

Further, load and play principles do not provide reproducible playback performance across a variety of playback system configurations. In existing load and play systems, the presentation file used to specify the playback sequence of multimedia elements does not permit the playback times of certain multimedia elements to be fixed so as to maintained the synchronization of images playback with respect to a background soundtrack under different system conditions.

Because of existing differences in the speeds of operation and memory access between available desktop systems, (e.g. a 166 Mhz Pentium® system versus a 50 Mhz 486 type system), a presentation sequence which results in synchronized playback on a relatively fast system where it is first assembled and tested, is often out of synchronization when played back on slower systems. Thus, an author assembling a presentation for playback on a relatively slow system must use a system of the same or similar speed in order to obtain predictable, consistent playback on such slow systems. In addition, an author of the multimedia presentation, being able to specify only the sequence of playing back multimedia elements rather than particular playback times, must rely on time-consuming trial and error techniques to achieve the desired timing and synchronization during playback, In addition, existing load and play systems are ill-suited for playing back presentations across a network because they require that all multimedia data elements be loaded into the memory of the playback system. This operational constraint is the source of several problems. A one-time or occasional viewer of the presentation is forced to configure the playback system to free sufficient memory to permit the large volume of multimedia data elements supporting the presentation to be copied into the local storage and active memory thereof.

Further, networks on which a on-demand presentations are to be provided must be capable of responding to undetermined throughput requirements in order to transfer the supporting multimedia data elements en masse, prior to their being played back during the presentation. Should the network be even moderately busy when the presentation reaches a point which requires the loading of additional data elements, undesirable delays will occur which cannot be readily mitigated.

In addition, systems on which network available presentations are to be played back must be provided with communications hardware and software for servicing the not readily determined throughput requirements for receiving the multimedia data elements at load-time. Finally, after playback of the network available presentation, the playback system user must be able to identify the names of the multimedia data element files which have been loaded, i.e. copied, onto the playback system and cause them to be deleted, in order to protect the playback system from memory overload.

Existing systems are not readily customized with user add-on features such as conditional statements which condition the performance of operations upon the occurrence of specified events. Existing off-the shelf systems provide few opportunities for varying the operation of a presentation based on events which occur during playback. Off-the-shelf systems do not provide the presentation author with freedom to choose the type of events upon which the performance of particular operations is conditioned, nor do they permit conditional statements to be added, removed, and changed during the playback, i.e. during the run-time of a presentation. Further, while methods exist for creating customized multimedia presentations having conditional statements for performing operations upon the occurrence of particular specified events, custom application programs must be written for assembling and playing back such presentations, requiring significant time and programming expense. Finally, such customized presentations cannot be reused readily with different multimedia data element content or the addition of or change in conditional statements.

Accordingly, it is an object of the present invention to provide a computer implemented system for assembling a multimedia presentation which permits an author to specify one or more times for playing back specified images and/or sounds of a multimedia data element, so as to facilitate synchronization upon playback.

Another object of the present invention is to provide a computer implemented system for assembling a multimedia presentation which generates a playback-oriented presentation data stream which does not require large playback system memory resources.

A further object of the present invention to provide a computer implemented system for assembling a multimedia presentation which permits an author to select a playback bandwidth for generating a bandwidth-controlled presentation data stream, thereby controlling network load and providing predictable performance on a variety of playback systems.

Still another object of the present invention is to provide a computer implemented system for assembling a multimedia presentation which gives an author unlimited freedom in specifying conditional statements to be inserted into a presentation data stream for varying the run-time playback of a presentation data stream.

Still another object of the present invention is to provide a computer implemented system for assembling a multimedia presentation which provides a playback-oriented presentation data stream containing data portions including commands and possibly also compressed image and/or sound data and/or a timestamp.

Still another object of the present invention is to provide a computer implemented system for assembling a multimedia presentation which regenerates a presentation data stream by finding and replacing data portions therein which correspond to multimedia elements which have been updated.

A further object of the present invention is to provide a computer implemented system and method for playing back a multimedia presentation which identifies data portions in a presentation data stream, extracts commands from those identified data portions, and uses the commands at run-time for controlling playback operations.

SUMMARY OF THE INVENTION

These and other objects are provided by the multimedia system and method of the present invention. The multimedia system and method of the present invention is implemented in three functional elements classified according to the respective functions they provide. First, an authoring tool element is provided for use by an author in building a presentation 'script' which contains a sequence of multimedia data elements to be reproduced and/or conditional statements to be used in effecting run-time branching and user interactivity. The authoring tool element is used by an author to specify images and/or sounds for playback at specified times at a selected system bandwidth. Second, an interleaver element is provided for generating a playback data stream from a presentation script which contains a list of multimedia data elements and one or more specified playback times, to provide controlled, predictable playback of images and/or sounds. Third, a playback interpreter element is used to provide consistent deinterleaving, command interpreting, and images and/or sound reproduction on a computer system from a playback data stream.

Although the description of the present invention which follows focuses generally on a software embodiment which aids in providing cross-platform interoperability and broad-based usage, the skilled person in the art will recognize that the particular functional elements of the present invention and the principles of operation thereof can be implemented in hardware with potentially advantageous increases in speed and/or data handling capabilities.

The authoring tool element is used by an author to build a presentation script which specifies a sequence of images and/or sounds to be reproduced during playback, and one or more times at which the particular images and/or sounds are to be played back. The authoring tool element is an application program which includes a user interface. An application programming interface (API) is included for permitting external user functions to be added on.

The authoring tool permits an author to select a playback bandwidth, within which sufficient data representing images and/or sounds for playback at one or more specified times is to be buffered for reproducing the images and/or sounds on the playback system. The authoring tool element thereby permits generation of a playback data stream which provides for consistent timed playback of images and/or sounds for particular bandwidths selected by the author in consideration of network and/or playback system limitations.

The authoring tool element is provided with software for calculating the amount of data required to play back specified images and/or sounds of a multimedia data element, and for calculating the time required to move sufficient data to play back the specified images and/or sounds within an author-selected bandwidth value. The authoring tool element is further provided with software for keeping track of the amount of buffered data to be played back prior to the playback of other images and/or sounds having specified playback times.

In operation, an author uses the authoring tool element to build a presentation script of images and/or sounds from existing multimedia data elements. The presentation script specifies one or more times for playback of the images and/or sounds. The authoring tool element may also be used to provide branching, conditional or external function call inputs for tailoring the run-time operation of the playback data stream with desired interactivity. For the bandwidth selected by the author, the authoring tool element determines if a playback data stream can be generated which provides sufficient throughput for reproducing the specified images and/or sounds at the specified times.

The interleaver element of the present invention is used to generate a playback data stream having a determinable bandwidth from the presentation script to provide consistent playback performance across a variety of playback platforms and network configurations. The interleaver element is used to process multimedia data elements specified in the presentation script in order to bring them together into a unified stream of playback data and commands used for playback operations.

The interleaver element contains software for compressing images and sounds data into compressed data, software for apportioning the compressed data into utilizable portions, and further software for generating commands for playback operation and further for the recognition and manipulation of the compressed data portions. Further software is provided for assembling commands with their associated compressed data when present into recognizable portions, and then appending the resultant portions into a playback data stream.

In operation, the interleaver element reads the script generated by the authoring tool element and identifies the images and/or sounds to be reproduced during playback. The interleaver element also identifies one or more specified times at which particular images and/or sounds are to be played back. For each of the images and/or sounds specified in the presentation script, the interleaver element makes a copy of a multimedia data element which contains them, and compresses the specified images data and/or sounds data. The compressed images data and/or sounds data are then apportioned into utilizable portions, which can be generally uniform in size, but which are not subject to any particular size constraints other than such upper limits which are determined by the bandwidth limitations of the network and playback systems.

The interleaver element also uses the presentation script to generate commands for the coordinated, timed performance of commands and playback of images and/or sounds specified therein.

Using the times specified by an author in the presentation script, the interleaver element generates a timestamp for the performance of commands and playback of images and/or sound and appends the timestamp in an interleaved data portion which contains the data to be played back. When the interleaver element encounters branching, conditional statements, or calls to functions outside of the multimedia system software, such commands are processed for inclusion in the playback data stream with destination tags indicating the designation of run-time software used to interpret those commands.

The multimedia system of the present invention is further provided with a playback interpreter element used to reproduce images and/or sounds represented by a playback data stream and for interpreting commands, function calls, branching statements, and/or conditional statements, together with run-time input, to provide a consistent, interactive presentation. The playback interpreter element can be implemented as a body of software maintained as playback system resident software loaded from local storage media into active memory during playback, or as network resident software to be accessed and loaded dynamically from the network at time of playback.

The playback interpreter element includes a plurality of function-specific software engines which are used to deinterleave a playback data stream, decompress and play back images or sounds data extracted therefrom, and interpret commands to provide coordinated, timed playback of the presentation. The playback interpreter element further includes software for effecting run-time alterations in event monitoring and branching by conditional statements extracted from the playback data stream.

The playback interpreter element includes a playback manager software engine used to identify utilizable portions of the playback data stream containing commands and data when present, timestamps for required playback, and the destination names of software engines. The playback manager software is also used to service calls from an application program through application programming interface software provided in accordance with the present invention.

The playback interpreter element further includes a video display software engine used to interpret display commands and to decompress images, and/or video data for display. An audio playback software engine is also provided for interpreting audio playback commands and for decompressing sounds data for playback.

An event handler software engine is further provided for handling event and logic condition monitoring in accordance with conditional statements which are determined at initialization time or extracted from the playback data stream during playback. The event handler software engine monitors for the occurrence of events, including operator or other run-time input, and flags their occurrence, thereby permitting branching and/or software function calls to be generated by other playback interpreter software, e.g. the manager software engine.

Finally, the playback interpreter element is provided with a loader software engine which pre-loads playback data streams for caching and playback of high data quantity playback data streams. The loader software engine is a highly preferred feature of the present invention and is not required, nor ordinarily used for providing the herein described functions in accordance with the present invention.

In operation, the manager software engine of the playback interpreter element scans an incoming playback data stream to identify and parse recognizable portions of the data stream into a header, commands, and a timestamp and/or associated data when present. The header identifies a destination software engine used to interpret the commands and play back associated data when present.

After parsing the portion into a header, commands, timestamp when present, and data when present, into their respective parts, the manager software engine passes them to the particular functional software engine for further operations therewith. For example, if the portion contains a header and commands designating the audio playback software engine as the destination, the audio playback software engine receives from the manager software engine a parsed header which specifies the audio playback software engine as destination and provides a command for loading or playing back data contained in the portion, or redirecting it to a file pointer. Operations are performed in like manner for playing back images data from a portion containing such data.

When the event handler software engine receives a header designating it and a conditional statement, the event handler performs operations to begin monitoring for the occurrence of the event specified in the conditional statement. After identifying a conditional statement from data it receives, the event handler software engine places it in an active buffer used to monitor for the occurrence of the event. Then the event handler proceeds in monitoring for the occurrence of the event. Event monitoring continues until the event handler software engine receives a command cancelling the prior conditional statement or receives another conditional statement which modifies it.

The event handler may perform event monitoring in accordance with any arbitrary number of received conditional statements. A particular application of event monitoring in accordance with the present invention is in providing for interactive branching and playback in response to received input from playback system users or other run-time input. For example, a conditional statement may be passed to the event handler which provides for branching to a different playback data stream upon receipt of pointing device (e.g. mouse) input from a user at a particular location of a display image. If the specified user input is received, the presentation is branched to provide playback from a different playback data stream. If the specified user input is not received, playback of the presentation continues as before.

In a highly preferred embodiment of the invention, the manager software engine of the playback interpreter element includes multiple thread handling software for managing parallel playback operations from a plurality of playback data streams. In operation, the multiple thread handling feature can be used to provide multiple track audio, video, and event monitoring output from a plurality of playback data streams. The playback data streams used for parallel playback may either be loaded from multiple storage and/or network sources during run-time, or pre-loaded into playback system memory by a preferred feature of the loader software engine.

DETAILED DESCRIPTION OF THE PREFERRED EMBODIMENTS

As described in the foregoing, the multimedia system of the present invention includes an authoring tool element, an interleaver element, and a playback interpreter element. The authoring tool element is constructed and operates in accordance with the description provided in the foregoing summary of the invention.

Figure 1:
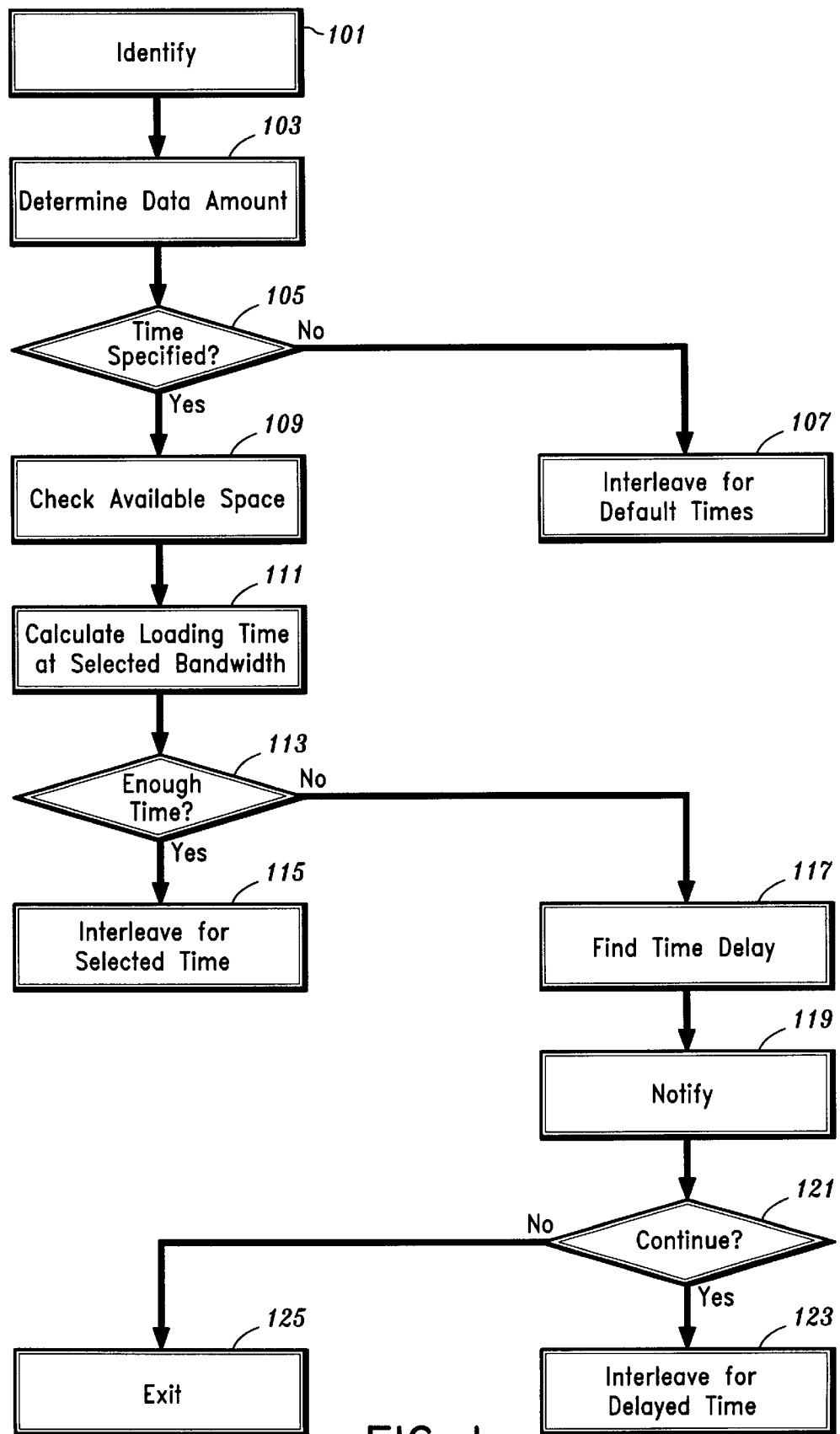
FIG. 1 is a flowchart illustrating the presentation script checking operations of the authoring tool element constructed in accordance with the present invention.

FIG. 1 is a flowchart illustrating the presentation script checking operations of the authoring tool element constructed in accordance with the present invention. After an author uses the authoring tool element to build a presentation script for displaying images and/or sounds and performing other operations, e.g. external function calls, operator input event monitoring, etc. the authoring tool element performs the operations shown in FIG. 1 to determine if the images and/or sounds and/or other operations specified in the presentation script can be timely played back or performed within the bandwidth selected by the presentation author.

To begin, the authoring tool element identifies, in step 101, for each line of the script, the particular images data and/or sounds data that are to be included in the presentation. The amount of data required to play back the images data and/or sounds data is then determined, in step 103, with reference to the multimedia data source files from which the images and/or sounds data are extracted. Next, in step 105 the authoring tool element determines if a particular time has been specified for the playback of the particular images data and/or sounds data. If no time has been specified, the authoring tool element permits the images data or sounds data to be interleaved for playback, in step 107, at indeterminate default times.

However, if a playback time has been specified, the authoring tool element performs further operations to determine if the particular images data and/or sounds data can be played back within the bandwidth specified by the author. First, the amount of available buffer space is determined, in step 109, for use in further determining how soon and how rapidly the specified images data and/or sounds data can be provided to the playback system at the time of playback. The authoring tool element determines available buffer space as a simulated determination of the playback system's available active memory when it reaches the particular line of the presentation script where the time-specified images and/or sounds data are to played back. Next, the loading time required to load sufficient data to represent the specified images and/or sounds is calculated, in step 111. A check is then performed, in step 113, to determine if a playback system at the specified bandwidth would have sufficient time to load the data required to play back the specified images and/or data at the specified times. If there is sufficient time, in step 115 the authoring tool element permits the specified images and/or data to be interleaved for playback at the specified times. If there is not sufficient time, the authoring tool element finds the delayed time at which playback can occur and notifies the author of the same (steps 117, 119). The author is then allowed to choose whether to continue and have the specified images data and/or sounds data interleaved for playback at the calculated delayed time (steps 121, 123), or to exit, in step 125, the presentation script-checking operations, in order to perform editing of the presentation script.

The interleaver element of the present invention is used to build an interleaved playback data stream for delivery of images and/or sounds for playback within the bandwidth specified by the author of the presentation. By playing back presentations using an interleaved playback data stream, consistent playback operation is achieved across a variety of playback platforms and network configurations. The interleaver element contains software for compressing images and sounds data into compact compressed data, software for apportioning compressed data into utilizable portions, and further software for generating commands for execution during playback and for recognition and manipulation of the compressed data portions. Software is further provided for assembling commands with their associated compressed data, when present, into recognizable objects, and then appending the resultant objects into a playback data stream.

Each Portion has the strucuture: EngineID+Command+DispatchTime+MessageSize+MessageData[]

The interleaver element uses header and command formats as specified in Table 1 below:

TABLE 1

Portion Header and Command Structure

| Portion Element | Description |
| --- | --- |
| EngineID | 4 character ASCII ID of destination software engine |
| MessageID | 4 character ASCII Message to destination software engine |
| DispatchTime | Time to dispatch Message |
| Messagesize | Size of MessageData (when present) |
| MessageData | MessageData (padded to min. 4 bytes) |

The EngineIDs and MessageIDs passed to the various software engines of the playback interpreter element include the commands specified in the following Table 2:

TABLE 2

| EngineID | MessageID | Description |
| --- | --- | --- |
| DISP | | Video Software EngineID |
| DISP | LOAD | Load image message for loading and decompressing video frame or image(s) with effects |
| DISP | DRAW | Draw image message for displaying an image or video frame |
| DISP | SIM | Simulate image message directing element data to file pointer |
| DISP | PAL | Palette message setting a new color palette for display |
| AUDI | | Audio Software EngineID |

TABLE 2-continued

| EngineID | MessageID | Description |
|---|---|---|
| AUDI | LOAD | Load audio message for loading and decompressing sounds data |
| AUDI | PLAY | Play audio message for playing back sounds data |
| AUDI | SIM | Simulate audio message directing element data to file pointer |
| LODR | | Loader Software EngineID |
| LODR | LOAD | Load message for loading pre-loaded stream into memory |
| LODR | SIM | Simulate message directing element data to file pointer |
| EVNT | | Event Software EngineID |
| EVNT | SET | Set message for passing conditional event statement for run-time interpretation |

In operation, after a presentation script has been checked for compliance with the specified bandwidth, it is used by the interleaver element of the present invention to build an interleaved playback data stream for providing timed, coordinated delivery of images and/or sounds data for playback within the specified bandwidth. For the images and/or sounds specified in the presentation script, the interleaver element makes a copy of a multimedia data element which contains them, and compresses the specified images data and/or sounds data. The compressed images data and/or sounds data are then apportioned into utilizable portions, which can be generally uniform in size, but which are not subject to any particular size constraints other than such upper limits which are determined by the bandwidth limitations of the network and playback systems. The interleaver element generates a timestamp for the performance of commands or playback of images and/or sound in the playback data stream and appends the timestamp in a portion containing the data to be played back.

The interleaver element then combines the portions of images and/or sounds data into recognizable portions containing a header designating a run-time software engine, a command, a possible timestamp, a data quantity indicator, and the data. Event commands such as conditional statements are also placed in recognizable portions containing a header, and the event command, and a possible timestamp for the expiration of the event command. The recognizable portions are then appended according to the sequence and playback times specified in the presentation script to build an interleaved playback data stream file.

Figure 2:
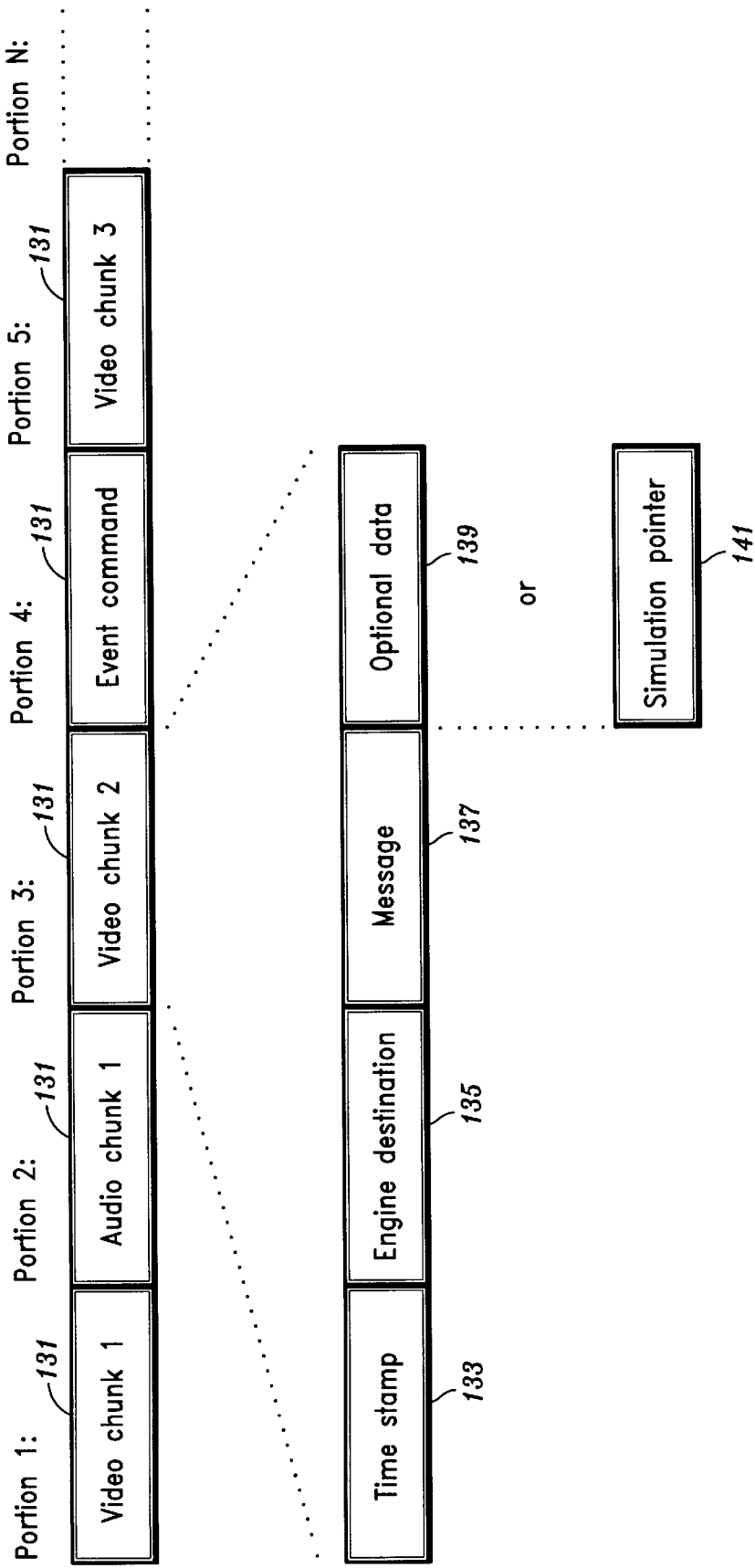
FIG. 2 shows an example of the appended portions which make up an interleaved playback data stream generated by the interleaver element constructed in accordance with the present invention.

FIG. 2 illustrates an example of an interleaved playback data stream which results by operation of the interleaver element of the present invention. As shown in FIG. 2, portions 131 containing data and/or commands for use by different run-time software engines are placed one after another to form the interleaved playback data stream. For example, as shown in FIG. 2 the interleaved playback data stream contains a portion 131 containing a first video chunk data 1, followed by a portion 131 containing a first audio chunk data 1, which is then followed by a portion 131 containing a second video chunk data 2. The portion 131 containing a second video chunk data 2 is highlighted in FIG. 2. As shown, the portion includes a header including a timestamp 133 for playing back the data therein, a run-time software engine destination 135, and data 139 when present, or a simulation pointer 141 used to specify a file to which data is to be sent.

Figure 3:
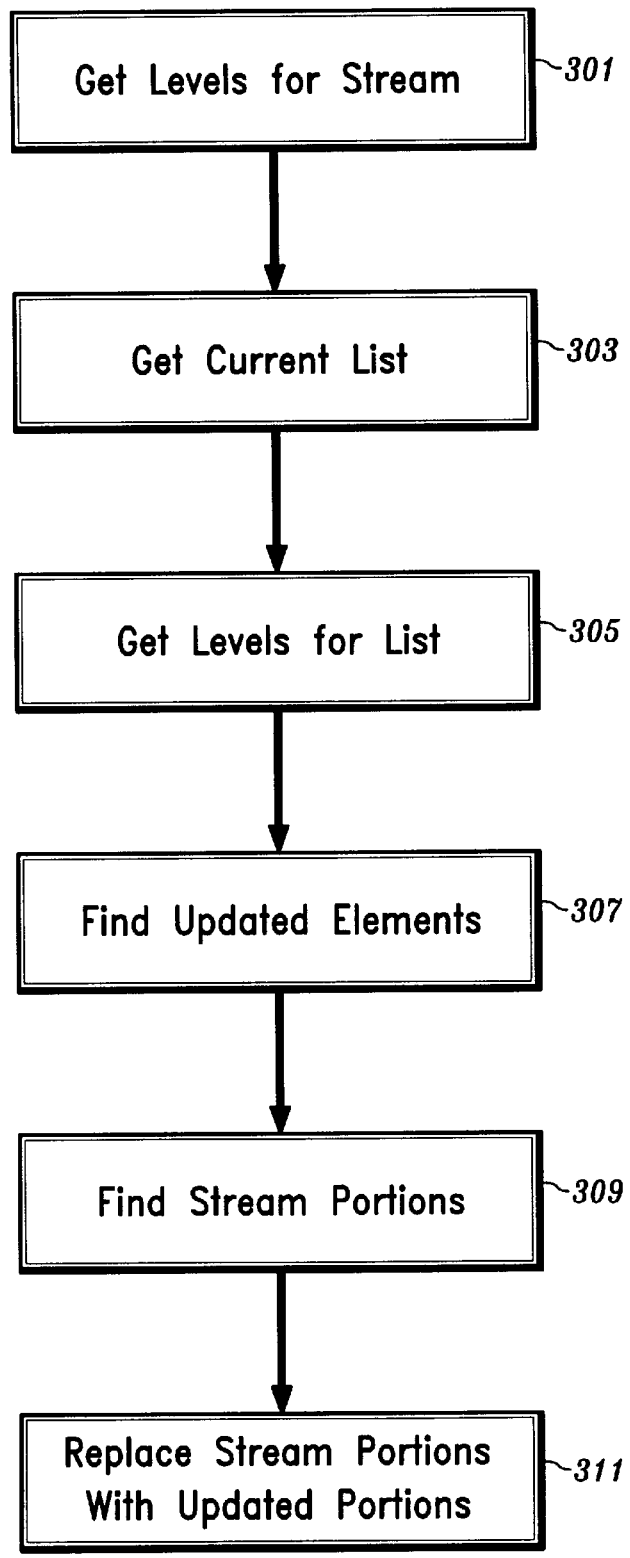
FIG. 3 is a flowchart illustrating the operations of the interleaver element in regenerating a playback data stream to incorporated updated multimedia data elements.

FIG. 3 illustrates the operations of the interleaver element of the present invention as used to regenerate a playback data stream after a change has been made in one or more multimedia data elements from which the playback data stream has been generated. As shown in FIG. 3, the interleaver element obtains, in step 301, information indicating the original levels of the multimedia data elements used in building the interleaved playback data stream. The interleaver element also obtains, in step 303, a current list or script containing the names of the multimedia data elements to be used for building the updated playback data stream. The level information for the multimedia data elements on the current list are obtained, in step 305. The interleaver element then determines, in step 307, which, if any, of the multimedia data elements on the current list are updated versions of the ones used in generating the playback data stream before. With this information, the interleaver element then scans the existing playback data stream, in step 309, to find portions of the stream which correspond to the updated multimedia data elements. After processing the updated multimedia data elements into portions according to the foregoing description of operations, the existing stream portions are replaced with the newly generated updated stream portions. In this way, the time and overhead required to regenerate the playback data stream are much reduced below what is required to generate the playback data stream anew.

The multimedia system of the present invention further includes a playback interpreter element used to reproduce images and/or sounds represented by a playback data stream and to interpret commands, function calls, branching statements, and/or conditional statements therein, in conjunction with run-time input, to provide a consistent, interactive presentation. The playback interpreter element can be implemented as a body of software maintained as playback system resident software to be loaded from local storage media into active memory during playback of a presentation, or as network resident software to be accessed and loaded from the network dynamically at time of playback.

Figure 4:
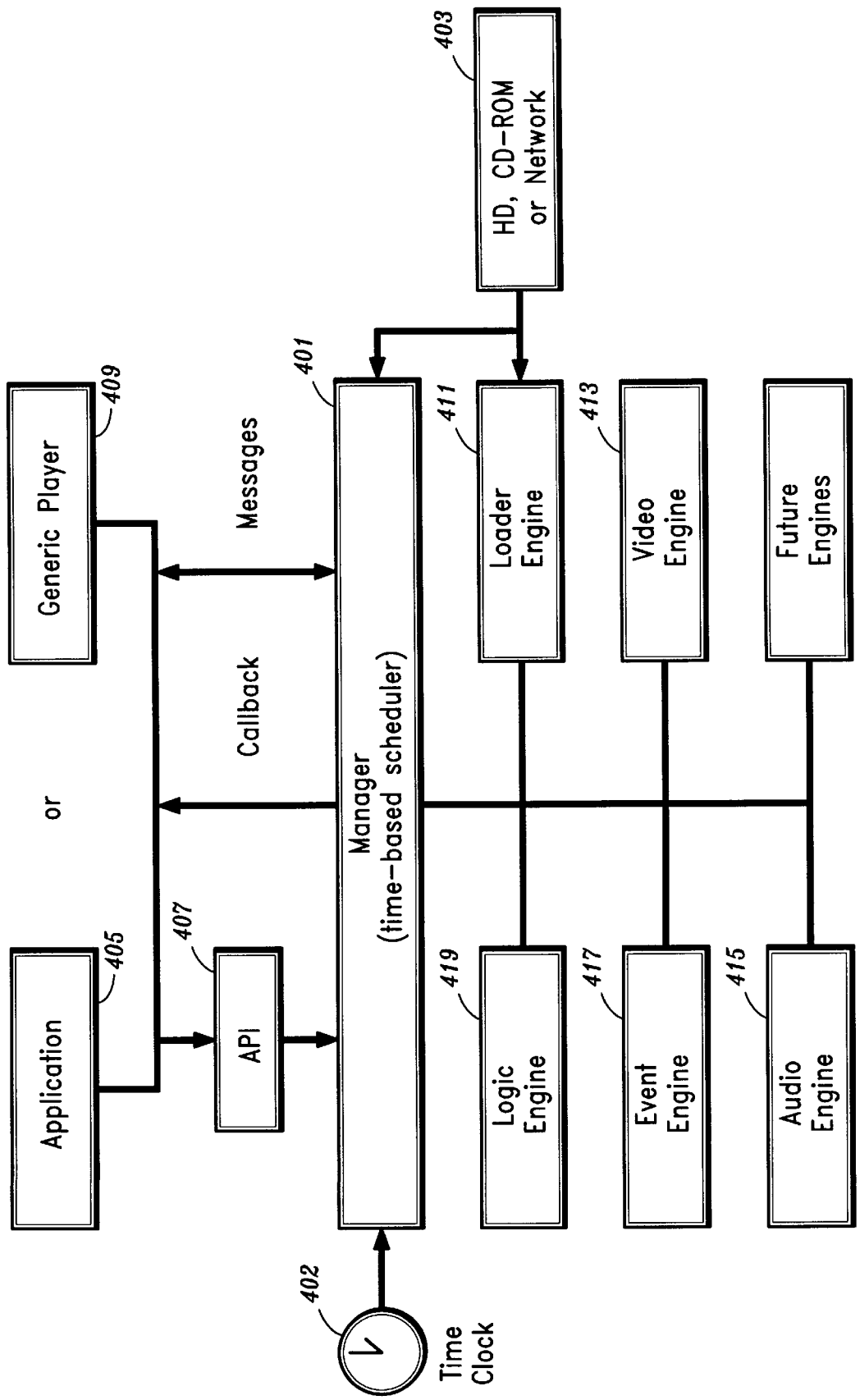
FIG. 4 is a block diagram illustrating the structural and functional relationships of the different software engines and external interfaces of the playback interpreter element constructed in accordance with the present invention.

The playback interpreter element includes a plurality of function-specific software engines which are used to deinterleave a playback data stream, decompress and play back images or sounds data extracted therefrom, and interpret commands to provide coordinated, timed playback of the presentation. FIG. 4 illustrates the structural and functional relationships between the software engines and the external interfaces of the playback interpreter element. As shown in FIG. 4, a manager software engine 401 is used to load playback data stream input from a local storage media 403, e.g. magnetic, optical, or magneto-optic disc or tape media, or from a network, also referred to as 403. Besides the initial loading of playback data stream input, the playback manager software engine 401 is used to identify individual portions of the playback data stream which contain commands and possible associated data, timestamps for required playback and the names of destination software engines to which the commands and data when present are to be passed. The playback manager software 401 is also used to service calls from an application program 405 through application programming interface software 407 provided in accordance with the present invention. The manager software engine is also used to transmit programmed messages such as external function calls, function call return messages and perform data passing to an application program 405 or a generic player element 409. The manager software schedules the passing of commands to the different software engines 411 through 419 in accordance with input from a time clock 402.

The loader software engine 411 is used to perform loading and caching operations in addition to those performed by the manager software engine, in response to commands extracted from the playback data stream and messages received from the manager software engine 401. The loader software engine 411 is used to handle data loading other than that normally performed by the manager software engine 401. The loader software engine 411 performs pre-loading of playback data streams for caching and playing back high data quantity playback data streams. The loader software engine is a highly preferred feature of the present invention and is not essential, nor ordinarily used for providing the herein described functions in accordance with the present invention. Other data loading in addition to the data loading performed through processing of the playback data stream.

The playback interpreter element further includes a video display software engine 413 used to interpret display commands and to decompress graphic, images, or video data for display. The video software engine 413 is equipped to interpret commands for loading and playing back images data from the playback data stream, using a file pointer for loading other playback data, and other commands for selecting a color palette used for displaying images. The video software engine provides output for reproduction of images and/or video by available image reproducing software on a display system. The particular playback data stream commands used to operate the video software engine 413 are listed in the foregoing Table 1.

An audio playback software engine 415 is also provided for interpreting audio playback commands and for decompressing sounds data for playback. The *particular playback data stream commands used to operate the audio software engine 415 are listed in the foregoing Table 1. The output of the audio software engine is used for reproducing sounds by available sound reproducing software on a speaker system.

The playback interpreter element of the present invention is further provided with an event handler software engine 417 and a logic software engine 419 for use in handling event and logic condition monitoring in accordance with conditional statements which are determined at initialization time or extracted from the playback data stream during playback. The event handler software engine 417 monitors for the occurrence of events, including operator or other run-time input, and flags their occurrence, thereby permitting branching and/or software function calls to be generated by further playback interpreter software in accordance therewith. The logic software engine 419 tests for the occurrence of other conditions prompting branching and/or communications with elements outside of the playback interpreter element.

Figure 5:
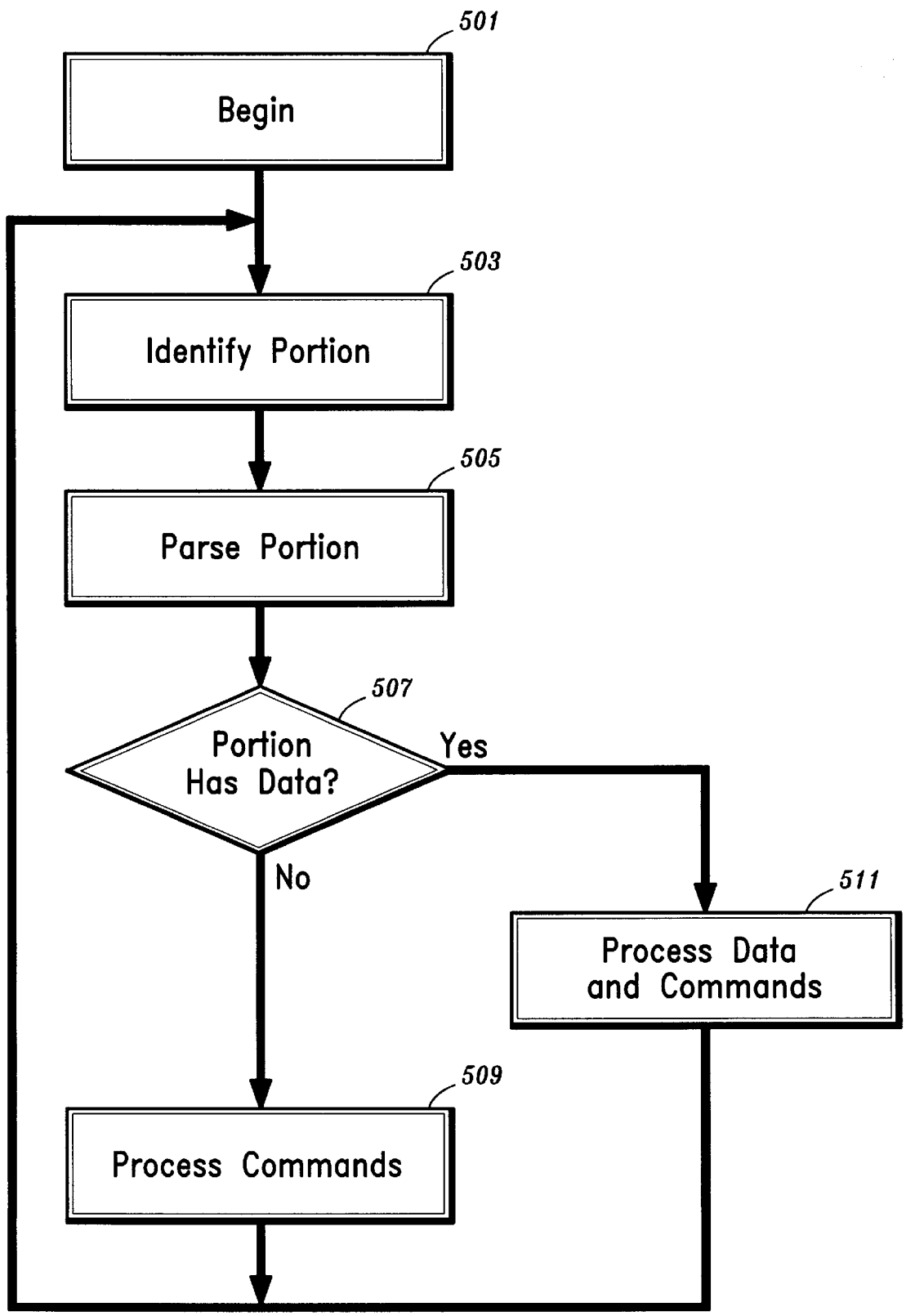
FIG. 5 is a flowchart illustrating operations of the playback interpreter element constructed in accordance with the present invention.

In operation, the manager software engine 401 scans an playback data stream input from local storage media or a network 403. Referring to FIG. 5, after the playback data stream begins to flow into the playback system (step 501), the manager software engine 401 identifies, in step 503, the individual portions of the data stream which contain a header, commands, and possibly a timestamp and/or associated data. As illustrated in FIG. 2, the header identifies a destination software engine used to interpret the commands and play back associated data when present. The manager software engine 401 then parses the header, commands, and timestamp when present, into their respective parts (step 505) and passes them to the proper software engine for further operations therewith. For example, if the portion contains a header and commands designating the audio software engine 415 as the destination, the audio software engine 415 receives from the manager software engine 401 a data portion containing a header which identifies the audio software engine 415 as the destination and a command for loading or playing back data contained in the portion, or using a file pointer for loading other playback data.

Figure 6:
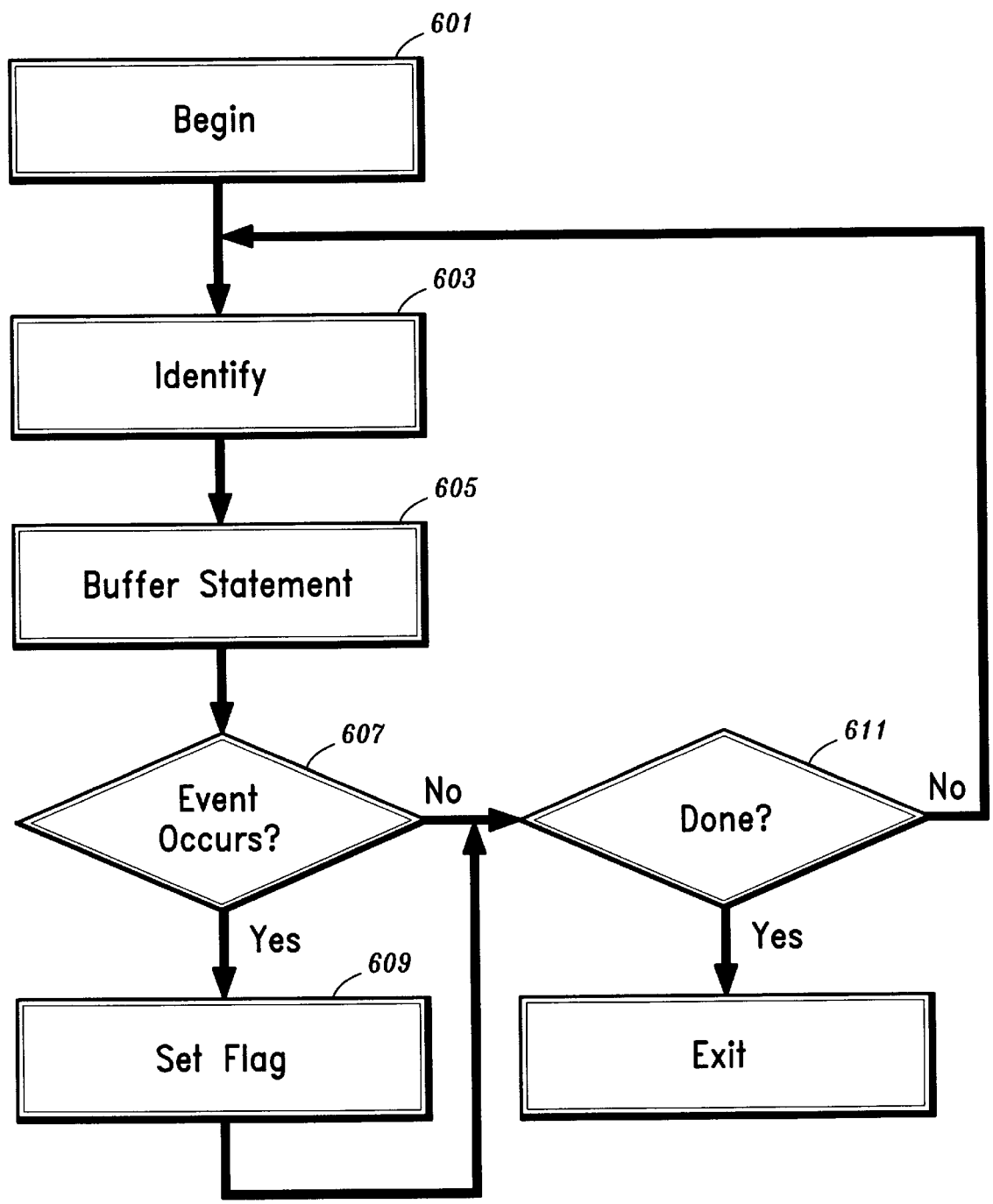
FIG. 6 is a flowchart illustrating operations of the playback interpreter element for handling conditional statements received during playback of a presentation.

After receiving the parsed portion from the manager software engine 401, the audio software engine 415 performs different operations based on whether data is present in the portion. If no data is present, the audio software engine 415 proceeds in processing the commands contained in the portion (step 509). If data is present, the audio software engine 415 performs the appropriate data processing (step 511). Operations are performed in like manner for playing back images data from an images portion containing a header identifying the video software engine 413 as the destination. When the event handler software engine 417 receives a header specifying it as the destination and a conditional statement is also provided, the event handler software engine 417 performs a set of operations to begin monitoring for the occurrence of the event specified in the conditional statement. Referring to FIG. 6, after playback data stream input begins to be received (step 601), the event handler software engine may identify, in step 603, a conditional statement received from a data portion parsed by the manager software engine 401. The event handler software engine 417 then places the conditional statement in an active buffer (step 605) used to trigger monitoring for the occurrence of the event. As shown in step 607, the event handler software engine 417 proceeds to monitor for the event. If the monitored event occurs, the event software engine flags its occurrence and generates a message indicating the same to the manager software engine for performing the appropriate response (step 609). The event monitor software engine 417 continues to monitor for the occurrence of the event until playback is completed (step 611), or until it receives a command which cancels the conditional statement or receives another conditional statement which modifies it.

The event handler software engine 417 performs event monitoring in accordance with any arbitrary number of conditional statements culled from the playback data stream. A particular way in which event monitoring according to the present invention may be applied is for providing interactive branching and playback in response to input received from playback system users or other machine-generated input. For example, a conditional statement may be passed to the event handler which provides for branching to a different playback data stream upon receipt of pointing device (e.g. mouse) input from a user at a particular location of a display image. If the specified user input is received, the presentation is branched to provide playback from a different playback data stream. If the specified user input is not received, playback of the presentation continues as before.

Figure 7:
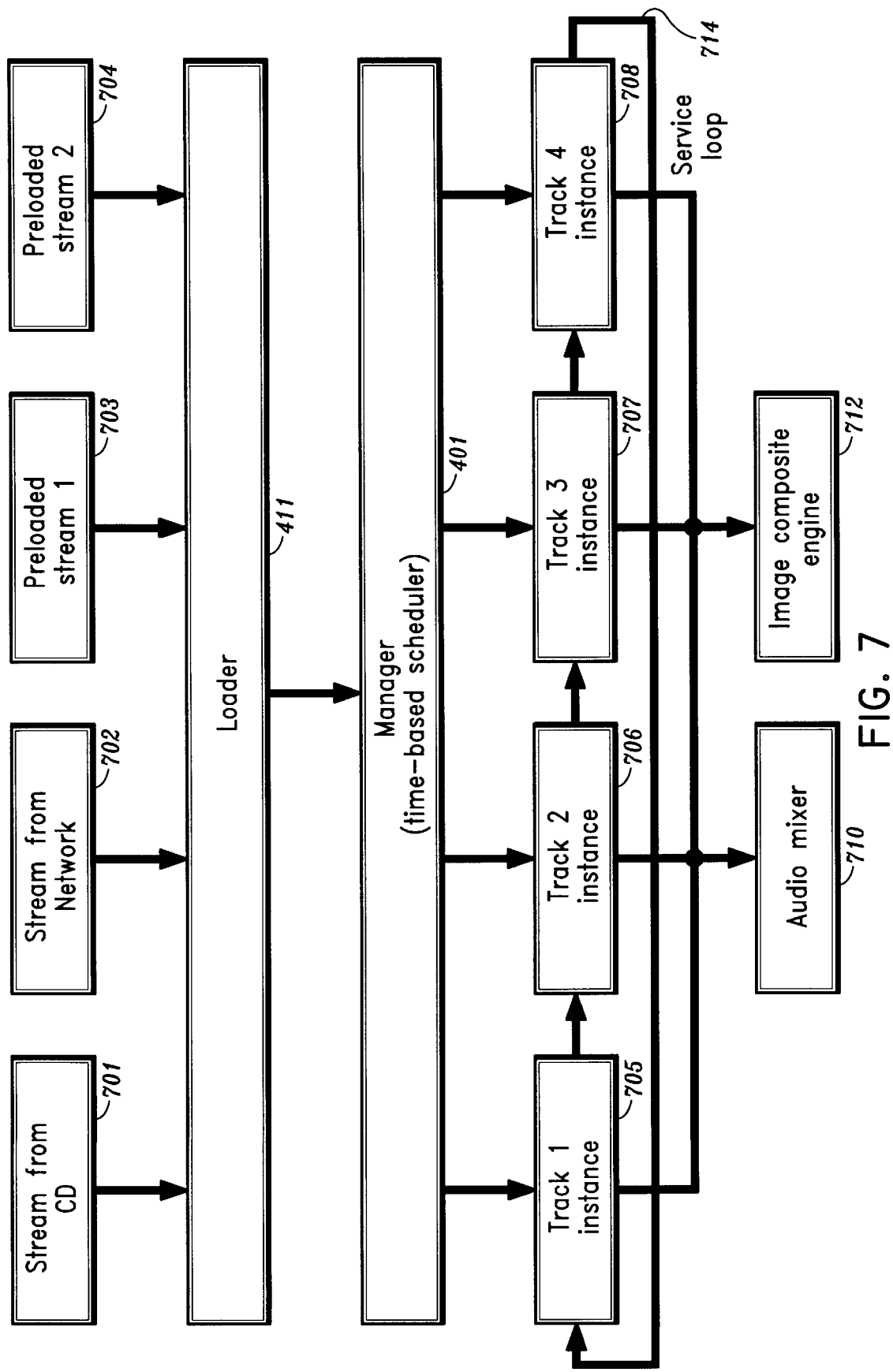
FIG. 7 is a block diagram illustrating multi-threaded parallel playback operations performed by the playback interpreter element constructed in accordance with the present invention.

In a highly preferred embodiment of the invention, the manager software engine 401 of the playback interpreter element is provided with facilities for handling multi-threaded parallel playback operations. FIG. 7 contains a block diagram illustrating parallel playback operations performed by the manager software engine in this highly preferred embodiment for delivering high quality multi-track multimedia presentations.

As shown in FIG. 7, multiple run-time instances of the audio software engine, video software engine, and event handler software engine can be used to perform playback and event handling operations in parallel. The multiple run-time instances 705, 706, 707, and 708 process the commands and data when present in the portions, and provide parallel playback output to an audio mixer 710 and to an image composite engine 412.

The audio mixer 710 is used to appropriately combine the several audio playback outputs of the audio software engines of the run-time instances 705, 706, 707, and 708. The image composite engine 712 is used to appropriately combine the several parallel image playback outputs of the video software engines of the run-time instances 705, 706, 707, and 708. Service loop 714 indicates a preferred order for the communication of data and/or messages between the run-time instances 705, 706, 707, and 708, and the audio mixer 710 and image composite engine 712.

In operation, the manager software engine 401 receives playback data stream input from a plurality of sources 701, 702, 703, and 704 through a loader software engine 411. The manager software engine 401 identifies and parses the playback data stream into headers, commands, and timestamps and/or data when present, as described in the foregoing with reference to FIG. 4. After identifying the parsed commands and headers of the parsed portions extracted from the playback data stream, the manager software engine 401 queues the parsed portions to be passed at the appropriate times to particular ones of multiple run-time instances 705, 706, 707, and 708. The audio software engine, video software engine, and event handler engines of each of the multiple run-time instances 705, 706, 707, and 708 perform operations in parallel to provide separate "tracks" of audio and images playback output. The several audio track playback outputs are combined by the audio mixer 710 to form a combined output for reproduction by available sound reproducing software on a speaker system. The several video track playback outputs are combined by the image composite engine 712 to form a combined signal for reproduction by available video and image reproducing software upon a display screen.

While the invention has been described in detail herein in accordance with certain preferred embodiments thereof, many modifications and changes therein may be effected by those skilled in the art. Accordingly, it is intended by the appended claims to cover all such modifications and changes as fall within the true scope and spirit of the invention.

What is claimed is:

1. A computer implemented method for generating a multimedia presentation data stream of at least one of images and sounds for timed, coordinated reproduction of said at least one of images and sounds, comprising the steps of:

generating a list specifying a plurality of data elements representing at least one of images and sounds and, for at least some of said data elements, specifying one or more times for playback of said images and sounds;

selecting a playback bandwidth with which to deliver at least one of said images or sounds;

identifying from said list said data elements and said one or more times for playback of said images and sounds;

dividing each of said data elements into one or more data portions; and combining said data portions in a multimedia presentation data stream for delivery of said data portions to a computer system within said selected bandwidth for timed coordinated reproduction of said at least one of images and sounds.

2. The method according to claim 1 further comprising the steps of:

determining, for each of said time-specified images or sounds, if a data quantity for reproducing said images or sounds can be delivered at said specified time within said specified bandwidth;

notifying an operator if said images or sounds cannot be delivered at said specified time.

3. The method according to claim 2 further comprising the steps of:

determining a delayed time at which said time-specified images and sounds can be reproduced; and notifying an operator of said delayed time.

4. The method according to claim 1 including the further step of accessing said multimedia presentation data stream to reproduce said images and said sounds at said specified times.

5. A computer implemented method for regenerating a replayable multimedia presentation data stream generated from a list of data elements representing images and sounds, comprising the steps of:

identifying original level indicators for each of said data elements in said data stream, said original level indicators being determined at the time said multimedia presentation data stream was generated;

generating a current list of data elements;

generating a current level indicator for each of said data elements in said current list;

comparing said current level indicators with said original level indicators to identify one or more updated data elements;

locating original data portions in said multimedia presentation data stream which correspond to said updated data elements;

dividing said updated data elements into one or more updated data portions; and replacing said original data portions with said updated data portions.

6. A computer implemented method for generating a reconfigurably processed data stream of at least one of images and sounds, comprising the steps of:

receiving a plurality of data portions which represent at least one of images and sound, with at least some of said images and sounds having a specified playback time;

receiving a conditional input statement appended to one or more of said data portions for varying the processing of one or more of said data portions according to operator input received at run-time; and combining said data portions and said conditional input statements into a data stream.

7. The method of claim 6 further including the steps of:

receiving said data stream at run-time;

extracting said conditional input statement from said data stream; and applying said conditional input statement to operator input received at run-time to effect a run-time variation in the processing of one or more of said data portions.

8. A computer implemented method for reproducing a multimedia presentation from a playback data stream at run-time, said data stream containing data portions of at least one of images and sounds and commands associated with each of said data portions for processing said data portions, said data portions being combinable to represent images and sounds reproduced in said multimedia presentation, comprising the steps of:

identifying said data portions;

extracting said at least one of images and sounds from said data portions;

extracting said associated commands; and processing said data portions in accordance with said associated commands to reproduce said images and said sounds.

9. A computer implemented system for generating a multimedia presentation data stream for timed, coordinated reproduction of at least one of images and sounds, comprising:

means for generating a list specifying a plurality of data elements representing at least one of images and sounds and for at least some of said data elements, specifying one or more times for reproducing said images and sounds;

means for selecting a bandwidth with which to deliver at least one of said images or sounds;

means for identifying and obtaining each of said data elements means for dividing each of said data elements into one or more data portions; and means for combining said data portions in a multimedia presentation data stream for delivery of said data portions to a computer system within said selected bandwidth for timed coordinated reproduction of said at least one of images and sounds.

10. The system of claim 9 further comprising:

means for determining, for each of said time-specified images or sounds, if a data quantity for reproducing said images or sounds can be delivered at said specified time within said specified bandwidth.

11. The system of claim 10 wherein said means for determining further determines a delayed time at which said time-specified images and sounds can be reproduced.

12. A computer implemented system for reproducing a multimedia presentation from a playback data stream at run-time, said data stream containing data portions and commands associated with each of said data portions for processing said data portions, said data portions being combinable to represent images and sounds reproduced in said multimedia presentation, comprising:

means for identifying said data portions;

means for extracting said associated commands; and means for interpreting said associated command;

means for processing said data portions in accordance with said associated commands to reproduce said images and said sounds.

* * * * *